United States Patent
Diekmann et al.

(10) Patent No.: US 10,970,142 B2
(45) Date of Patent: *Apr. 6, 2021

(54) TRANSFORMING PLUG-IN APPLICATION RECIPE VARIABLES

(71) Applicant: Oracle International Corporation, Redwood Shores, CA (US)

(72) Inventors: Tim Diekmann, San Jose, CA (US); Tuck Chang, Santa Clara, CA (US); Najeeb Andrabi, Cupertino, CA (US); Anna Igorevna Bokhan-Dilawari, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,011

(22) Filed: Oct. 24, 2019

(65) Prior Publication Data

US 2020/0057684 A1 Feb. 20, 2020

Related U.S. Application Data

(63) Continuation of application No. 15/994,368, filed on May 31, 2018, now Pat. No. 10,496,454.

(60) Provisional application No. 62/527,949, filed on Jun. 30, 2017.

(51) Int. Cl.
*G06F 9/54* (2006.01)
*G06F 9/451* (2018.01)
*G06F 9/445* (2018.01)
*G06F 8/34* (2018.01)

(52) U.S. Cl.
CPC ............ *G06F 9/542* (2013.01); *G06F 8/34* (2013.01); *G06F 9/44526* (2013.01); *G06F 9/451* (2018.02)

(58) Field of Classification Search
CPC .............................. G06F 9/541; G06F 9/542
USPC .................................................. 719/318, 328
See application file for complete search history.

(56) References Cited

U.S. PATENT DOCUMENTS 8,589,955 B2  11/2013  Roundtree et al.
2011/0154290 A1  6/2011  Kelly

*Primary Examiner* — Andy Ho
(74) *Attorney, Agent, or Firm* — Invoke

(57) ABSTRACT

Techniques for transforming plug-in application recipe (PIAR) variables are disclosed. A PIAR definition identifies a trigger and an action. Trigger variable values, exposed by a first plug-in application, are necessary to evaluate the trigger. Evaluating the trigger involves determining whether a condition is satisfied, based on values of trigger variables. A second plug-in application exposes an interface for carrying out an action. Evaluating the action involves carrying out the action based on input variable values. A user selects, via a graphical user interface of a PIAR management application, a variable for a trigger or action operation and a transformation operation to be applied to the variable. The PIAR management application generates a PIAR definition object defining the trigger, the action, and the transformation operation, and stores the PIAR definition object for evaluation on an ongoing basis.

23 Claims, 8 Drawing Sheets

TRANSFORMING PLUG-IN APPLICATION RECIPE VARIABLES

INCORPORATION BY REFERENCE; DISCLAIMER

Each of the following applications are hereby incorporated by reference: application Ser. No. 15/994,368 filed on May 31, 2018; application No. 62/527,949 filed on Jun. 30, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to plug-in-application recipes. In particular, the present disclosure relates to plug-in application recipe variables.

BACKGROUND

A plug-in-application recipe ("PIAR") is a set that includes a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. A plug-in application may supply the action. A plug-in application that supplies an action may be the same as, or different than, a plug-in application that supplies a trigger.

A PIAR management application presents an interface that allows a user to define PIARs. A PIAR definition indicates one or more actions to be executed by the PIAR management application. A PIAR definition further indicates a trigger of a plug-in application. When a PIAR management application detects that a trigger condition is satisfied, the PIAR executes the action(s) corresponding to the detected trigger.

A PIAR management application may be used for many purposes. For example, a PIAR management application may be used to automate repetitive tasks. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action).

The term "plug-in application" refers to the fact that an application's trigger(s) and/or action(s) logically 'plug in' to the PIAR and thus become part of the logic of a PIAR. For example, PIAR management applications may be organized according to a micro-services architecture, such that several independent services are plugged into the PIAR application. A plugged-in service may provide monitoring service(s) specific to a particular application to support trigger(s) for the particular application. Alternatively or in addition, a plugged-in service may provide action service(s) specific to the particular application to support executing action(s) for the particular application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PLUG-IN APPLICATION RECIPE MANAGEMENT SYSTEM
3. TRANSFORMING A PIAR VARIABLE
4. USER INTERFACE EXAMPLES
5. MISCELLANEOUS; EXTENSIONS
6. HARDWARE OVERVIEW
7. COMPUTER NETWORKS AND CLOUD NETWORKS
8. HARDWARE OVERVIEW

1. General Overview

One or more embodiments include a graphical user interface (GUI) of a plug-in application (PIAR) recipe management application. The PIAR management application manages PIAR definitions. Each PIAR definition identifies at least one trigger and at least one action. The PIAR management application makes the action conditional on the trigger on an ongoing basis.

The values of a trigger are necessary to evaluate the trigger on an ongoing basis, and are exposed by a first plug-in application to the PIAR management application. An instance of evaluating the trigger involves determining whether a condition is satisfied, based at least in part on one or more values of the one or more trigger variables.

A second plug-in application exposes an interface to the PIAR management application for causing the second plug-in application to carry out an action. An instance of evaluating the action involves carrying out the action based on one or more values of one or more input variables.

In an embodiment, a user selects, via the GUI and prior to a particular instance of evaluating a particular operation of a PIAR definition, a variable from a plurality of candidate variables for the operation. The operation may be a trigger operation or an action operation. A user also selects, via the GUI, a transformation operation to be applied to the variable. The transformation operation is one of a plurality of displayed candidate transformation operations for the variable.

The PIAR management application generates a PIAR definition object defining the particular trigger, the particular action, and the transformation operation. The PIAR management application stores the PIAR definition object for evaluation on an ongoing basis.

One or more embodiments described in this Specification and/or recited in the claims may not be included in this General Overview section.

2. Architectural Overview

Figure 1:
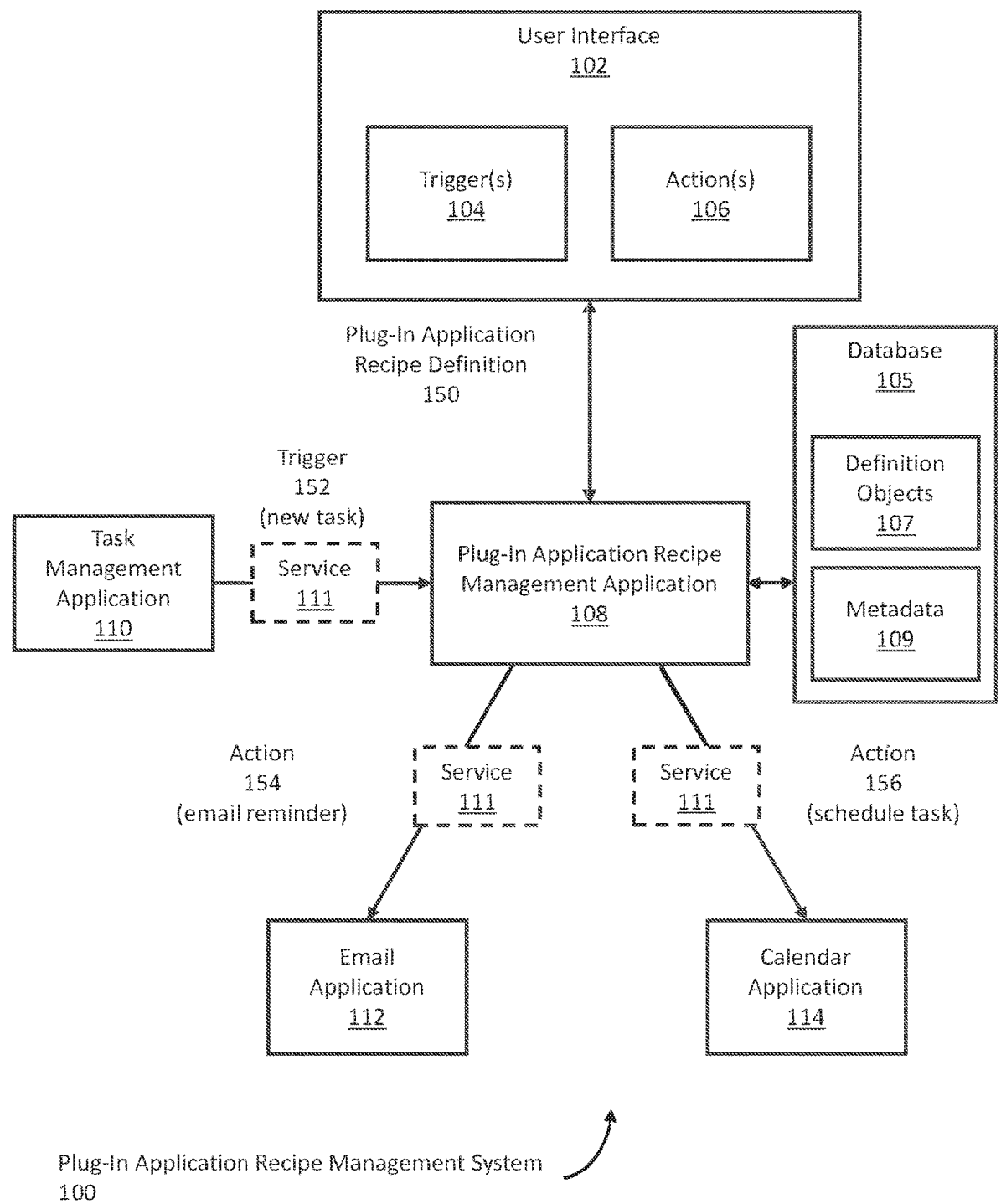
FIG. 1 is a block diagram illustrating a plug-in application recipe management system according to an embodiment.

FIG. 1 is a block diagram illustrating a plug-in application recipe (PIAR) management system 100 according to an embodiment. The PIAR management system 100 includes functionality to generate at least one PIAR in which a variable is transformed.

As illustrated, the PIAR management system 100 includes a PIAR management application 108 and various other components. Embodiments may include more or fewer components than those illustrated. Components may be implemented in software and/or hardware. Specifically, components may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device. Components may be local to or remote from each other. Each component may be distributed over multiple applications and/or machines. Multiple components may be combined into one application and/or machine. Two or more components may be communicatively coupled via a local area network, a wide area network, the internet, an intranet, a cellular network, and/or combinations thereof. Operations described with respect to one component may instead be performed by another component. Additional embodiments and/or examples relating to computer networks are described below.

In an embodiment, a PIAR management application 108 provides a user interface 102 for creating a PIAR definition 150. Specifically, the user interface 102 allows a user to select one or more triggers 104 and one or more corresponding actions 106 to be executed when the trigger(s) 104 are satisfied. As used herein, the trigger(s) 104 and action(s) 106 are referred to collectively as "operations" of the PIAR. Examples of PIARs include, but are not limited to: (a) responsive to detecting that a user's car is in the user's driveway (trigger), opening the user's garage door (action); (b) responsive to determining that a user's walked steps have not reached a particular goal by 5 p.m. (trigger), transmitting a notification to the user (action); (c) responsive to detecting a new sales contact in an address book or email (trigger), creating a new folder to store information about the sales contact (action). The user interface 102 may be a graphical user interface (GUI), a command line interface, or any other type of interface configured to receive user input for creating a PIAR definition 150. Examples of GUIs are discussed in detail below.

In an embodiment, in addition to the trigger(s) 104 and associated action(s) 106, the user interface 102 includes options to specify a name of a PIAR definition, a trigger application that is an application to be monitored for detection of the trigger(s) 104, and/or an application to be used to execute the action(s) 106. One or more of the action(s) 106 may involve generating a new PIAR definition, and one or more of the action(s) 106 may be executed by the PIAR management application 108 itself. A PIAR definition 150 may also include information other than the trigger(s) 104 and action(s) 106.

In an embodiment, a PIAR may involve multiple actions performed in response to detecting a trigger. One or more of the actions may be performed concurrently or in a fixed sequence. A combination of concurrent and/or sequential actions may be used. The output of one action may be used as input to another action. For example, suppose a PIAR is created with a trigger defined as receiving an email from a prospective customer (e.g. receiving an email at an email address only given to prospective customers). In this example, a series of actions performed in response to receiving the email may include (1) determining whether the prospect is already listed in a customer relationship management (CRM) application, and (2) if the prospect is not already listed in the CRM application, adding the prospect to the CRM application and sending a notification email to a sales manager. Adding the prospect to the CRM application and sending the notification email to the sales manager may be performed concurrently or in a particular order. For example, the notification email may be sent only after receiving confirmation from the CRM application that the prospect was added successfully. Many different combinations of concurrent and/or sequential actions may be used in a PIAR.

In an embodiment, one or more actions in a PIAR may be performed conditionally, based on evaluation of the initiating trigger or, if the action is part of a series of actions, evaluation of output from a preceding action. For example, conditional logic (e.g., if, then, else, etc.) may be used to determine, in response to detecting a trigger, the particular sequence of actions, if any, to perform. The PAIR management system 100 may include an interface allowing a user to define such conditional logic for a particular PIAR.

In an embodiment, evaluating a trigger and/or output of a preceding action may involve looping through multiple variable values. For example, a trigger or action may supply an array of values, and evaluating the trigger or action may involve iteratively evaluating (or "looping through") each of those values. Looping through such values may itself be subject to conditional logic. Many different combinations of conditional logic and/or looping through variables may be used to determine the particular action(s), if any, performed when a trigger is detected.

In an embodiment, a PIAR definition 150 includes one or more types of metadata. For example, metadata may identify a user who created the PIAR definition 150, a time and date of creation, an authorization level of the PIAR definition 150 (for example, whether the action(s) 106 are permitted to receive personally identifiable information), the plug-in application(s) associated with the trigger(s) 104 and/or action(s) 106, or any other type of metadata describing or associated with a PIAR. If a PIAR definition is generated recursively in the course of executing another PIAR, the recursively generated PIAR may be thought of as a "child"

PIAR and the PIAR that generated it may be thought of as a "parent" PIAR. Metadata associated with a child PIAR may include information about the parent PIAR, directly in the child PIAR's metadata and/or by reference to the parent PIAR's metadata.

In an embodiment, the PIAR management system 100 includes one or more applications that are linked or 'plugged in' to the PIAR management application 108. An application 'plugged in' to the PIAR management application 108 may be referred to as a "plug-in application." A particular plug-in application may be used as a "trigger application," i.e., an application to be monitored for detection of a trigger condition. Alternatively or in addition, a particular plug-in application may be used as an "action application," i.e., an application that executes an action when a trigger condition is satisfied.

In an embodiment, in general, plug-in applications are applications that are (a) executing independently of the detection process of the PIAR management application 108, (b) not being controlled by the detection process of the PIAR management application 108, and/or (c) remote from the PIAR management application 108. Thus, the plug-in application, executing independent of the detection process of the PIAR management application 108 that detects the specified trigger(s) 104, may be referred to herein as an independently executing application. Further, one or more plug-in applications may be considered 'stand-alone' applications relative to the PIAR management application 108. That is, a plug-in application may provide its own user interface (e.g., a GUI) through which a user accesses the full functionality of the plug-in application. In this manner, the plug-in application provides functionality entirely independent of the PIAR management application 108 and does not depend on the PIAR management application 108 to function. A stand-along plug-in application is not a module or component of the PIAR management application 108. One or more plug-in applications and the PIAR management application 108 may be developed and supported by entirely distinct business entities than each other. As an example, FIG. 1 illustrates plug-in applications that include a search application 110, an email application 112, and an audio player application 114, which are independently executing stand-alone applications. Many different types of plug-in applications may be used, and the examples illustrated in FIG. 1 should not be construed as limiting one or more embodiments.

In an embodiment, the PIAR management application 108 stores PIAR definitions (e.g., PIAR definition 150) as PIAR definition objects 107. The definition objects 107 may be stored in a database 105, for example, in a file system, or in any other type of digital storage. The PIAR management application 108 may also store metadata associated with PIAR definitions in the database 105 or other storage. The metadata 109 may be stored within (i.e., as logical components of) definition objects 107 or separately. In an embodiment, definition objects 107 are stored in JavaScript Object Notation (JSON) format, with elements in the JSON structure corresponding to trigger(s) 104, action(s) 106, and/or metadata 109. The JSON structure may also include one or more elements corresponding to transformation operations to be applied to variables associated with PIAR trigger and/or action operations.

In an embodiment, functionality of a plug-in application that is accessible to the PIAR management application 108 is a subset of the plug-in application's full functionality. Specifically, a plug-in application may expose an application programming interface (API) providing access to certain functions and/or data of the plug-in application, without providing access to other functions and/or data of the plug-in application. In other words, the functionality exposed to the PIAR management application 108 may be a proper subset (a.k.a. strict subset) of the plug-in application's full functionality. For example, the API may be a restful state transfer (REST) API. Other types of APIs may be used. As an example, an email application may not expose email sending functionality to the PIAR management application 108, but may expose information about emails that have been received, such as the date, time, sender, recipient, subject line, and content of the email. As another example, a calendar application may not expose functionality to cancel events, but may expose information about events that have already been scheduled (e.g., date, time, location, participants, etc.) and/or functionality to schedule new events. The set of functionality exposed to the PIAR management application 108 may depend on one or more authorization policies. In an embodiment, the PIAR management application 108 stores an authorization token that it uses to authenticate access to a plug-in application's API. As an example, the PIAR management application 108 may prompt a user, via the user interface 102, to input a username and password to access an email application's API. The PIAR management application 108 may store the username and password in an encrypted token that it uses to request access to the exposed functions and/or data of the email application.

In an embodiment, the user interface 102 allows a user to specify triggers that do not correspond to functions or data natively exposed by a plug-in application. For example, a trigger application may expose data values that change over time, without natively exposing any functions that monitor or compare the data values as they change. A trigger may nonetheless be defined for monitoring the trigger application for changes in the data values over time. As another example, a trigger may look for an aggregate data value (e.g., summed or averaged over time or over a number of consecutive data retentions or changes), or a masked data value (e.g., a data value that indicates the presence or absence of data or a change in data, even though the data itself is masked to the PIAR management application 108 or the end user, or is altogether unavailable to the end user). Many different types of trigger conditions may be inferred, derived, or otherwise determined from a trigger application without being natively supported by the trigger application.

As an example, a search application 110 may be linked to ('plugged into') the PIAR management application 108. Linking the search application 110 to the PIAR management application 108 may involve monitoring the search application 110 (e.g., via a REST API) and reporting, to the PIAR management application 108, the detection of triggers defined in relation to the search application 110. For example, a trigger may involve detecting the execution of a search for receipts via the search application 110. The search application 110 may be monitored via a corresponding service 111 that detects when a search for receipts is executed via the search application 110. The service 111 notifies the PIAR management application 108 if and when a search for receipts is executed via the search application 110. The service 111 may be implemented separately from the search application 110 or as a component (e.g., an installable module or plug-in) of the search application 110.

As another example, the search application 110 corresponds to a car sales application. A potential customer may search for a car from a database of advertised cars and request a meeting with a sales representative to purchase the car. The trigger condition may be defined as receiving, from a user, a sales meeting request that references one of the advertised cars.

In an embodiment, a plug-in application includes a monitoring system for notifying the PIAR management application 108 of predefined trigger conditions, with predefined parameters that may be customizable. For example, an application may include a monitoring system that notifies the PIAR management application 108 when an application-specific trigger such as a keyword search on email is satisfied. The application may allow a limited amount of customization for that application-specific trigger, allowing customization in some ways (such as specifying the keyword for the search) without allowing customization in other ways (such as, for example, whether the keyword is within N words of another keyword, or whether information about an earlier email with the keyword has already been detected and stored in a table).

In an embodiment, monitoring a plug-in application (e.g. using a service 111) to identify a triggering event is done on an ongoing basis. That is, the monitoring process is initiated and continues to operate until a terminating condition is satisfied. Thus, a particular PIAR may be evaluated and executed many times, in response to many triggering events identified by the associated monitoring process. In general, a PIAR does not cease to operate upon the first instance of the selected triggering event. For example, a PIAR that opens a garage door in response to detecting a vehicle in the driveway may operate in perpetuity and cause the garage door to open dozens, hundreds, or even thousands of times. A monitoring process associated with a particular PIAR may operate in perpetuity until it is manually terminated by a user (e.g., via the user interface 102). Alternatively, a PIAR definition may include a terminating condition, such as a certain length of time to operate or a maximum number of times to perform actions in response to triggers. Typically a PIAR is created with the intent that it function as an automated background service, continuing to operate in perpetuity, without further manual intervention.

In an embodiment, the search application 110 (or other application plugged into the PIAR management application 108) is not in any way affected by the execution of the PIAR management application 108 which uses at least one of the fields managed by the search application 110 for detecting the trigger(s) 104. The PIAR management application 108 may correspond to micro-services that provide altogether different functionality than the independently executing search application 110. The PIAR management application 108 may determine that the action(s) 106 have been triggered when a change in the field(s) managed by the independently executing search application 110 satisfy a threshold criteria, such as a certain value or aggregated value. As an example, a field managed by the search application 110 may specify a location. Search results associated with the location are to be presented in response to a query. A change in city may satisfy the threshold criteria. The threshold criteria specified to the PIAR management application 108 may be different than any threshold criteria supported by the built-in monitoring process(es) of the plug-in application, even though the threshold criteria may be based on variables that are accessible from the plug-in application and even though such variables may change over time. The PIAR management application 108 may execute (directly or by causing execution by another process) the action(s) 106 in response to detecting that the action(s) 106 have been triggered.

Similar to a trigger application (e.g. search application 110), an action application (e.g., email application 112 or audio player application 114) is linked or plugged into the PIAR management application 108. An action application is an application that executes an action as directed or requested by the PIAR management application 108 (although the PIAR management application 108 may also be said to "execute" the action in the sense that the PIAR management application 108 initiates execution of the action). The PIAR management application 108 requests execution of actions in response to detection of triggers as described above. The action applications may be linked to the PIAR management application 110 via respective services 111. A service 111 may be implemented separately from or as a component of an action application. A service 111 may use an application programming interface (API) corresponding to an action application, to use the action application for executing an action according to a PIAR. A particular action application may also be a trigger application. That is, the same application may expose one or more triggers while also exposing an API for executing actions. The same application may be used as both a trigger application and an action application in the same PIAR, or in different PIARs.

In an embodiment, the PIAR management application 108 is itself an action application. The PIAR management application 108 may execute an action that generates a new PIAR. As an example, a new PIAR may be generated for managing client purchases. The new PIAR may define a trigger as a first purchase by a client. The new PIAR may define actions such as creating a database record for storing records of client purchases or creating a product recommendation list based on completed purchases by the client.

In an embodiment, the PIAR management application 108 supports PIAR definitions that involve a series of actions. For example, in response to a particular trigger, a PIAR may perform a particular action, "Action A." The output of Action A may then be used as input to another action, "Action B." The output of Action B may then be used as input to another action, "Action C," and so on. Functions and/or data exposed by Action A may be available as input to Action B and/or as input to subsequent actions, such as Action C. Functions and/or data exposed by a later action, such as Action C, may not be available as input to an earlier action, such as Action B or action A. For example, if Action B completes before Action C completes, then it is not possible for Action B to receive input from Action C.

In an embodiment, the user interface 102 includes options to specify one or more transformation operations to be applied to one or more variables used in a PIAR. A transformation operation is an operation that takes a particular value of a variable and modifies it to obtain a transformed value. For example, a transformation operation may concatenate data (e.g., two strings), filter out undesirable data (e.g. inappropriate information, or sensitive information such as personally identifiable information, convert lowercase to uppercase (or vice versa), transform a variable of one data type to a variable of another data type (e.g., a string to a date or number), or perform any other kind of transformation that may be applied to variables. Embodiments should not be considered limited to any particular kind of variable or kind of transformation.

In an embodiment, a transformation operation may be applied to variables from different sources and at different times. A transformation operation may be applied to a variable supplied by a trigger application before evaluating an associated trigger condition. For example, if the value of a string variable supplied by a trigger application is expected to contain date information, and the trigger condition is date-based, the string may be transformed to a date, allowing the trigger condition to be evaluated. A transformation operation may be applied to a variable supplied by a trigger application after evaluating an associated trigger condition. For example, the value of a date variable may be used to evaluate a trigger condition, and then transformed to a string for further use by the PIAR management application 108. A transformation operation may be applied to a variable that is being used as input to an action. For example, if an action requires a date as input, the value of a string variable may be transformed to a date. Examples of user interfaces for selecting transformation operations to apply to variables are discussed below.

Further, in an embodiment, multiple transformation operations may be applied, sequentially, to the same variable. As an example, a date may be transformed to a string, which may then be concatenated with additional text. As another example, a string may be converted to a number, which may then be applied to a mathematical formula. Many different sequences of transformations are possible. Examples of user interfaces for selecting sequences of transformation operations to apply to variables are discussed below.

In an embodiment, the PIAR management application 108 is configured to store information about transformation operations in the database 105 along with PIAR definition objects 107 and metadata 109. Specifically, a transformation operation may be stored as part of a PIAR definition object, inline with information describing the trigger(s) 104 and action(s) 106. For example, suppose a transformation operation is selected to be applied to one or more variables associated with a particular PIAR operation (i.e., trigger or action). Information about the PIAR operation may be stored in the PIAR definition object unmodified, i.e., intact as if no transformation operation had been selected. Information about the transformation operation may be stored elsewhere in the PIAR definition object, i.e., inline with the information about the PIAR operation and logically mapped to the PIAR operation, without altering the information about the PIAR operation.

In an embodiment, the transformation operation is represented in the PIAR definition object as scripting language (e.g., JavaScript or another scripting language), which may be retrieved from a stored set of available scripts (not illustrated in FIG. 1) corresponding to the transformation operations supported by the PIAR management application 108. The PIAR management application 108 may also allow users to manually enter custom scripts to use as transformation operations.

3. Transforming a PIAR Variable

Figure 2:
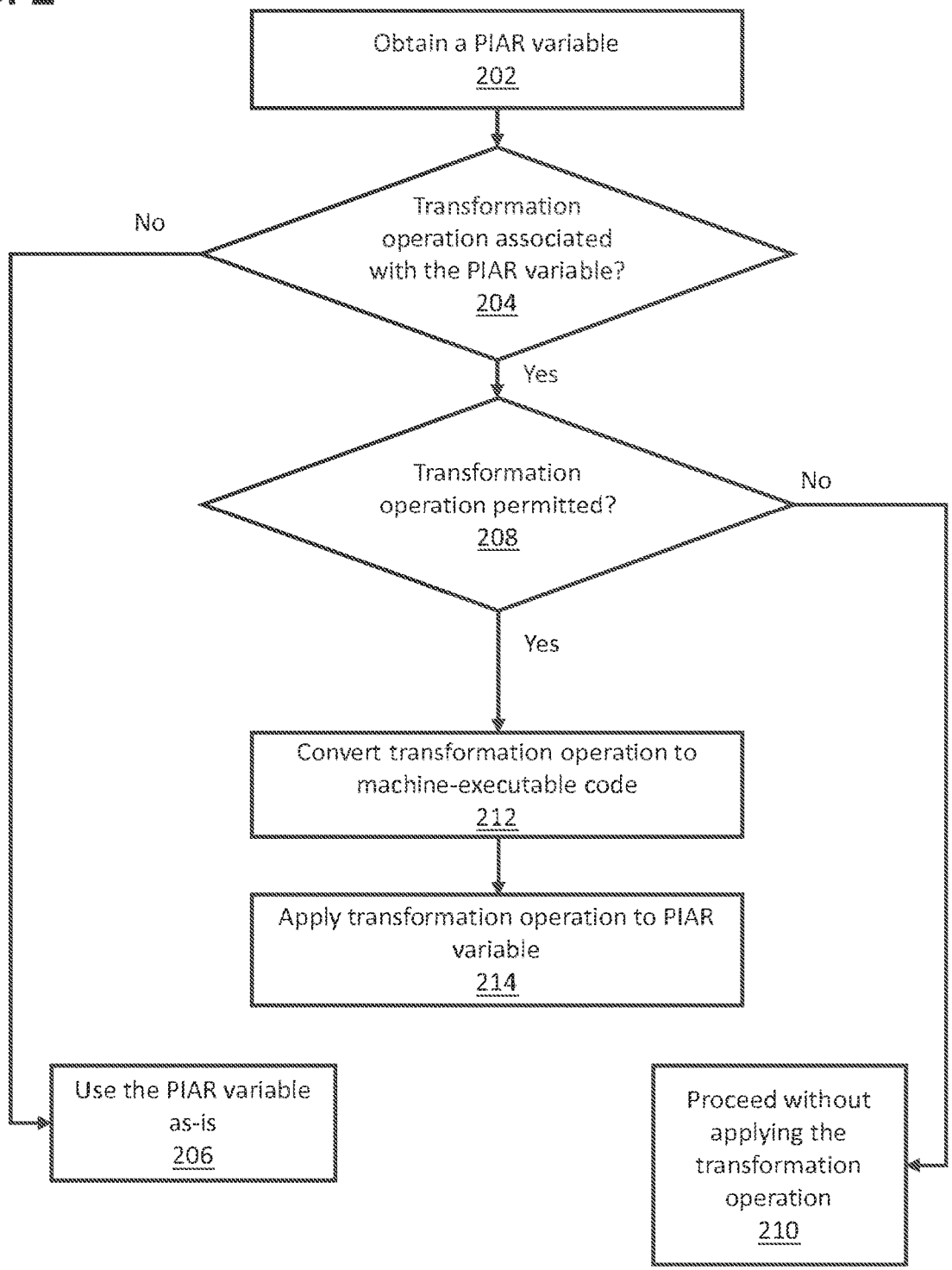
FIG. 2 illustrates a set of operations for transforming a PIAR variable in accordance with one or more embodiments.

FIG. 2 illustrates an example set of operations for transforming a PIAR variable in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., a PIAR management system as described herein) obtains a PIAR variable (Operation 202). Specifically, the system obtains the PIAR variable from a trigger application and/or as output from a preceding operation in a multi-operation PIAR. The system determines whether there is a transformation operation associated with the PIAR variable (Operation 204). To determine whether there is a transformation operation associated with the PIAR variable, the system may consult the PIAR definition object, stored as described above. In an embodiment, the system parses the PIAR definition object. During parsing, the system encounters the scripting language corresponding to the transformation operation. If the system does not encounter such scripting language, then there is no transformation operation associated with the PIAR variable and the system proceeds to use the PIAR variable as-is, i.e., without applying a transformation (Operation 206).

In an embodiment, if there is a transformation operation associated with the PIAR variable, then as a prerequisite to applying the transformation operation, the system determines whether the transformation operation is permitted (Operation 208). For example, if the transformation operation is stored in a PAIR definition object as scripting language, the system may determine whether the scripting language is permitted. Determining whether a transformation operation is permitted may be advisable, for example, if users are allowed to manually enter their own transformation operations that are not part of a predefined set made available by the system. The system may compare the transformation operation (e.g., scripting language) with a "whitelist" of permitted functions and/or a "blacklist" of prohibited functions. In an embodiment, a transformation whitelist and/or a transformation blacklist may include one or more user-defined PIAR restrictions and/or PIAR permissions. PIAR restrictions and PIAR permissions are described in further detail in U.S. Provisional Patent Application 62/527, 958, titled "Restricting Plug-In Application Recipes," incorporated herein by reference in its entirety.

In an embodiment, if the transformation operation is not permitted, the system proceeds without applying the transformation operation (Operation 210). The system may generate an error or warning, indicating that a prohibited transformation operation was attempted. Alternatively or in addition, the system may proceed to use the PIAR variable as-is, i.e., continue executing the PIAR without applying the transformation operation. Alternatively or in addition, the system may terminate execution of the PIAR and/or take another remedial action in response to encountering a prohibited transformation operation.

In an embodiment, the system converts the transformation operation to machine-executable code (Operation 212). For example, if the transformation operation is stored in the PIAR definition object as scripting language, the system convert the scripting language to machine-executable code. If the system performs an operation to determine whether the transformation operation is permitted (e.g., Operation 208), the system may convert the transformation operation to machine-executable code before or after making that determination.

In an embodiment, the system applies the transformation operation to the PIAR variable (Operation 214). If multiple transformation operations are mapped to a particular PIAR operation, the transformation operations may be applied sequentially, according to a sequence specified in the PIAR definition object. As an example, consider a trigger that outputs a variable named "region." Transformation operations to convert the value of the variable to uppercase and then reverse the order of the characters may be stored as follows:

trigger_output.region.toUpperCase( ).reverse( )

As another example, consider an action that accepts a date as input. In this example, the PIAR management application 108 receives date information from a trigger, but the date information is stored in a string object that cannot be supplied as input to the action. A transformation operation to convert the string to a date may be stored as follows:

trigger_output.date.toDate( )

Many different types of transformations may be used, which may be stored in various ways that may not involve scripting language. Accordingly, these examples should not be considered limiting of one or more embodiments.

4. User Interface Examples

FIGS. 3A-3D and 4A-4C illustrate examples of graphical user interfaces (GUIs) for defining a plug-in application recipe (PIAR) according to an embodiment. These illustrations are provided for exemplary purposes only. Many different types of GUIs exist that may include more or fewer graphical elements, and corresponding functionality, than the elements shown in FIGS. 3A-3D and 4A-4C. Accordingly, the GUIs illustrated in these figures should not be construed as limiting one or more embodiments.

Figure 3A:
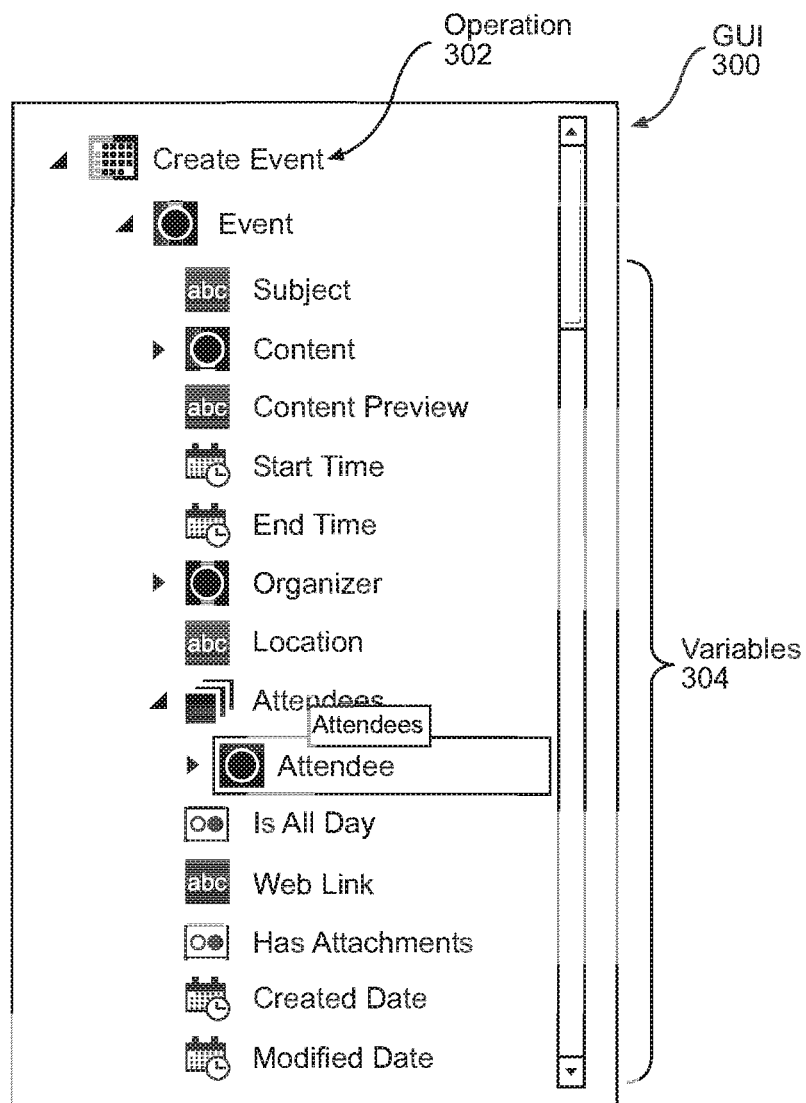
FIGS. 3A-3D and 4A-4C illustrate examples of graphical user interfaces for defining plug-in application recipes according to an embodiment.

In an embodiment, a PIAR includes at least two operations: (1) a trigger and (2) an action to be executed if and when the trigger condition is satisfied. As an example, the GUI 300 of FIG. 3A illustrates a "Create Event" operation 302 that may be selected by a user as part of a PAIR definition. More generally, the GUI 300 of FIG. 3A illustrates a hierarchical representation of variables that are exposed or supplied by a trigger operation and/or an action operation. In the example illustrated in FIG. 3A, the "Create Event" operation 302 involves at least one variable, i.e., an "Event" object. The "Event" object, in turn, includes multiple variables 304 of its own: subject, start time, end time, location, etc. In an embodiment, when a plug-in application is plugged into a PIAR management application 108, variables (e.g., the "Event" object and its component variables 304) that the plug-in application exposes or supplies are displayed in a user interface 102 (in this example, the GUI 300), where a user may select among them to define a PIAR. A user may supply input (e.g., mouse clicks, taps, keyboard input, etc.) to navigate the hierarchical representation. For example, a user may supply input to expand the "Create Event" operation and view one or more components that the operation exposes or supplies. FIG. 3A illustrates an expanded view of the "Create Event" operation. A user may subsequently supply input to expand one or more of those components. As shown in FIG. 3A, expanding the "Attendees" variable reveals a representation of the "Attendee" variable that is a component of the "Attendees" variable. Alternatively or in addition, a user may supply input to collapse or hide the visual representation of an operation or variable thereof. Alternatively or in addition, a user may supply input to 'drag and drop' an operation or variable into a labeled field as illustrated in FIG. 3B, thus allowing the user to visually manipulate the manner in which operations and their respective variables are arranged and used in a PIAR.

As noted above, an operation 302 may be a trigger or an action. Variables exposed or supplied by a trigger may be transformed before or after evaluating the trigger condition(s) to determine whether the PIAR's corresponding action should be executed. As an example, the "Create Event" operation 302 illustrated in FIG. 3A includes an "Organizer" variable corresponding to the person organizing the event in question. Suppose that the "Create Event" operation 302 is being used as a trigger operation, where the trigger condition is satisfied only if an event is created by a particular user. In order to more reliably evaluate the trigger, the "Organizer" variable may be transformed to uppercase characters before the trigger condition is evaluated. As another example, suppose the "Create Event" operation 302 is being used as an action operation, but a trigger operation supplies a start time only in string format. As shown by the icons associated with the variables in FIG. 3A, the "Start Time" variable expects a value in date-time format. Accordingly, the string value supplied by the trigger may be transformed to date-time format before being used as input to the "Create Event" operation 302, but after the trigger condition is evaluated. In the preceding example, the transformation may be mapped to either the trigger or the action.

Figure 3B:
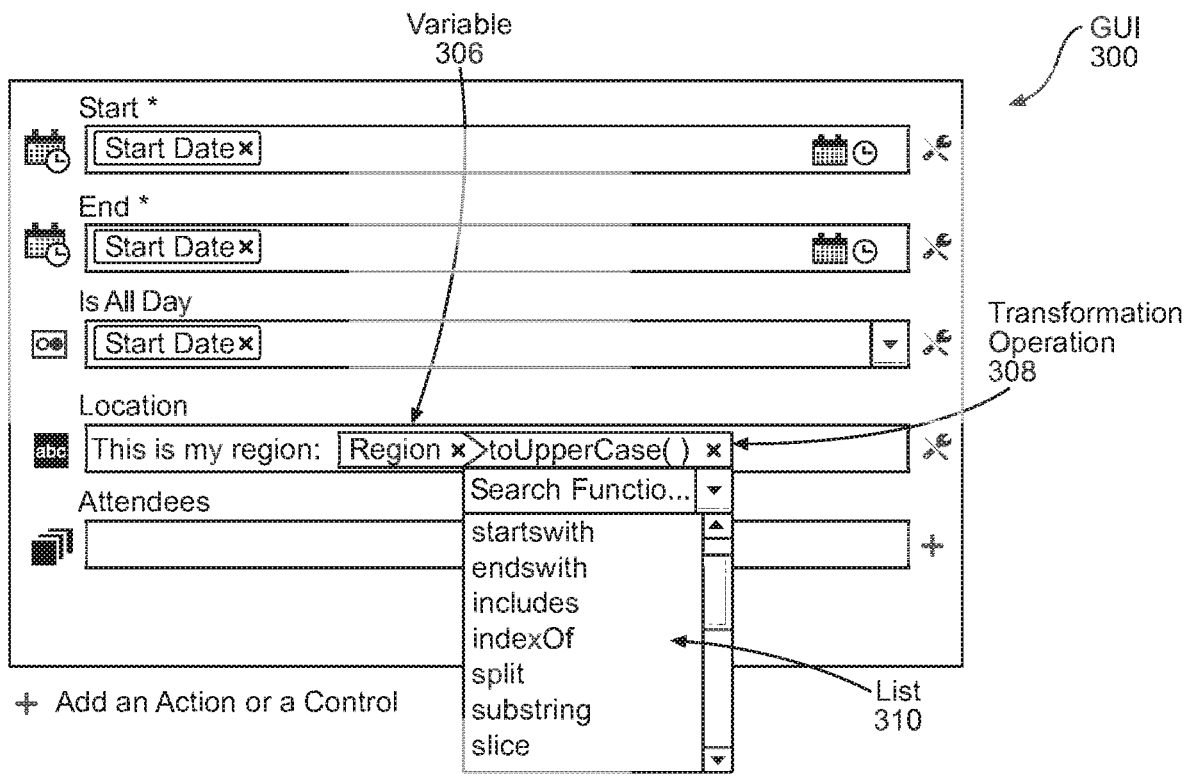

Continuing to FIG. 3B, when a user selects a variable to use in an operation (i.e., a trigger or action), a representation of the variable may be visually displayed in a labeled field. In the example illustrated in FIG. 3B, a series of labeled fields represent the inputs to a "Create Event" operation. The user has selected a "Region" variable 306 to be used as the "Location" of the event. In other words, the "Region" variable 306 has been selected to be used, after applying the selected transformations, as input to the "Create Event" operation. Specifically, the transformed "Region" variable 306 is to be used as the value of another variable exposed by the "Create Event" operation, i.e., the "Location" variable corresponding to the labeled field. The "Region" variable 306 may originate from a trigger operation. For example, the "Region" variable 306 may correspond to an output variable of a trigger associated with a customer relationship management (CRM) application that exposes information about sales representatives' assigned sales regions. The user may have selected the "Region" variable 306 via the selection of GUI elements such as those illustrated in FIG. 3A. Preceding the "Region" variable 306 in the labeled field, the user has typed some free-form text (i.e., "This is my region:"). This text may itself be viewed as a transformation, because it is to be concatenated with the "Region" variable 306. In addition, the user has selected a transformation operation 308 to be applied to the "Region" variable 306. In this example, the transformation operation 308 is a "toUpperCase( )" operation, for transforming the value of the variable to all uppercase characters.

In an embodiment, transformation operations (e.g. transformation operation 308) that are available to be applied to a particular variable (e.g. variable 306) are displayed in the GUI 300 as a list 310. In the example illustrated in FIG. 3B, the list 310 is a scrollable drop-down menu visually associated with the variable 306. Specifically, the drop-down menu is displayed as graphically contiguous and right-aligned with the visual representation of the variable 306, to assist the user in understanding the logical order of operations to be applied to the variable 306. Many different visual representations of transformation operations may be used, having different forms of visual correspondence, if any, with the visual representations of variables.

Further, in an embodiment, the transformation operations included in the list 310 or other visual representation are a subset of the full set of transformation operations supported by the PIAR management application 108. As an example, the list 310 may be filtered based on a data type of the variable 306, so that only transformation operations that are compatible with the variable 306 are available for selection. (It would not make sense to include a "toUpperCase( )" transformation for a variable that can only include numerical data, for example.) The list 310 may be filtered based on stored mapping(s) between compatible data type(s) and transformation(s). Alternatively or in addition, the list 310 may be filtered or ordered based on heuristics indicating the popularity of certain transformation operations in connection with certain variables. (For example, if the transformation operation most commonly applied to a string variable received from a calendar application is "toDate( )" then the "toDate( )" transformation operation may be displayed first in the list 310.) The heuristics may be based on prior uses of the variable and/or transformation operations for a particular user or across multiple users, such as all registered users of the PIAR management application 108 or all of those belonging to a particular organization. Heuristics may be stored in association with one or more types of variables, types of transformation operations, particular variables, and/or particular transformation operations. Stored heuristics and/or other metadata associated with different types of transformation operations (e.g., transformation operations in different categories and/or dealing with different types of data) may be used to guide the application, appearance, and/or order in which the transformation operations appear (or are omitted) in a list, drop-down menu, or other visual representation of the available transformation operations. When heuristics and/or other metadata are associated with different types of transformation operations, it may not be necessary to store heuristics and/or other metadata for each individual variable. Similarly, heuristics and/or other metadata may be stored in association with different types of variables rather than in association with each individual variable. However, heuristics and/or other metadata may be stored in association with different types of transformation operations and/or variables, while also storing heuristics and/or other metadata in association with individual transformation operations and/or variables. Many different types of filtering and ordering of transformation operations may be used.

Figure 3C:
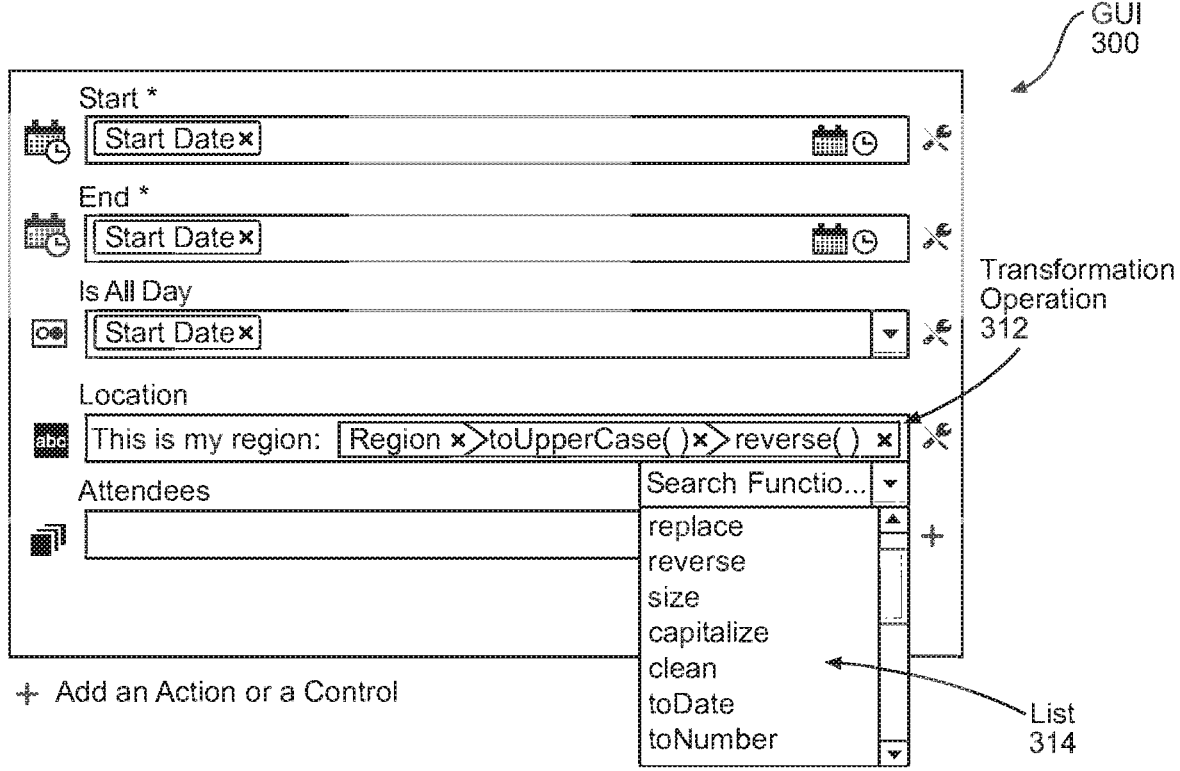
Figure 3D:
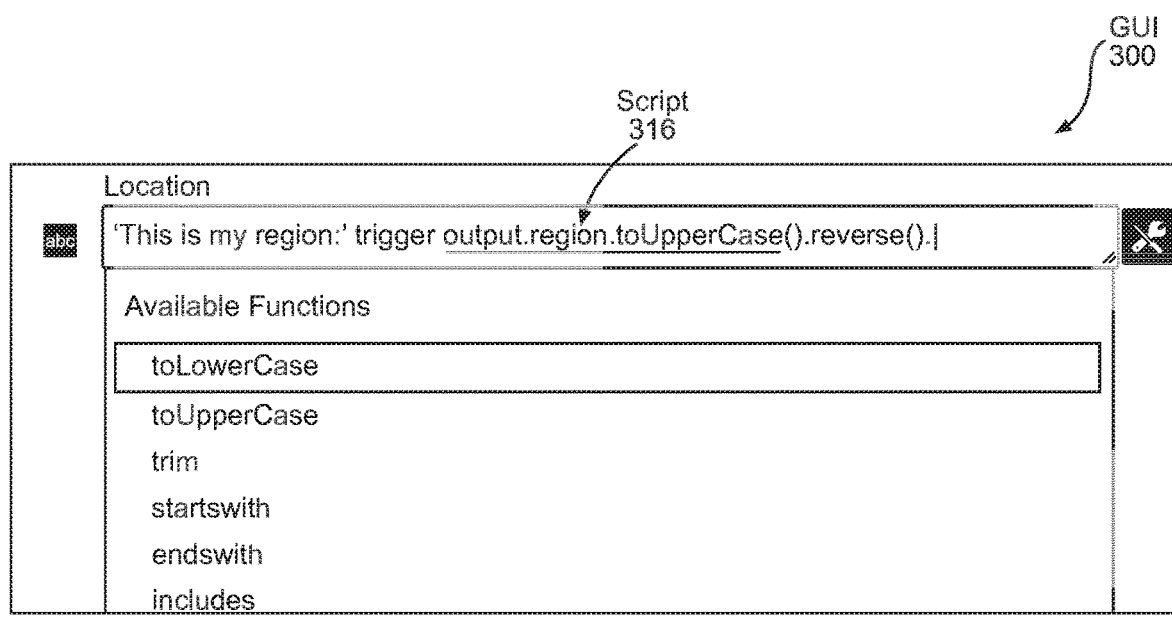

In an embodiment, multiple transformation operations may be applied sequentially to a particular variable. For example, as illustrated in FIG. 3C, the user has selected another transformation 312 to be applied to the "Region" variable 306 after first applying the "toUpperCase" transformation 308. In an embodiment, when the PIAR is executed, the transformation 308 receives an input data object from the left-hand side of the transformation 308 and passes an output data object to the right-hand side of the transformation object, optionally to another transformation operation as an input data object on the left-hand side of that other transformation operation. The transformation process may include any number of transformation operations. The list of transformation operations 314 available here may be the same or different than those available in the previous list 310. As an example, the list 314 available for a second transformation operation 312 may be filtered based on the data type that is outputted by the first transformation operation 308. Alternatively or in addition, the list 314 may be filtered or ordered based on heuristics indicating the popularity of certain transformation operations in connection with the preceding transformation operation. As discussed above, different types of heuristics may be applied across different sets of users.

In an embodiment, the GUI 300 permits a user to view scripting language corresponding to the selected transformation(s). For example, in FIG. 3D, the following script 316 is displayed in the GUI 300. In this example, the script corresponds to the transformations indicated in FIG. 3C. The script displayed by the GUI 300 is similar or identical to script used to represent the transformation(s) in a PIAR definition object.

'This is my region: ' + trigger_output.region.toUpperCase( ) .reverse( )

Figure 4A:
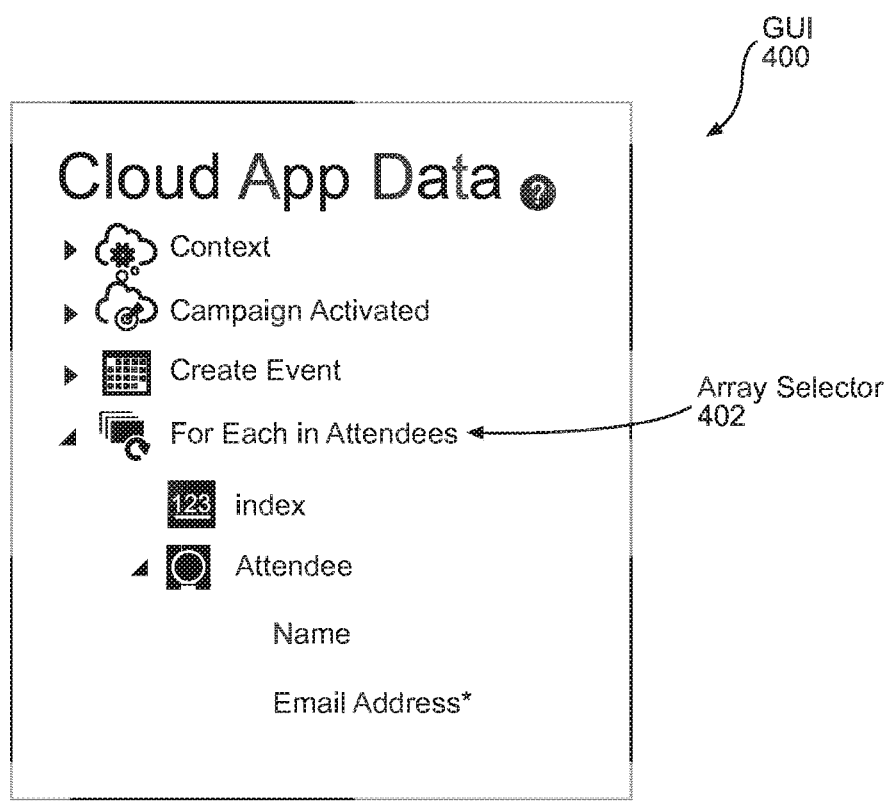
Figure 4B:
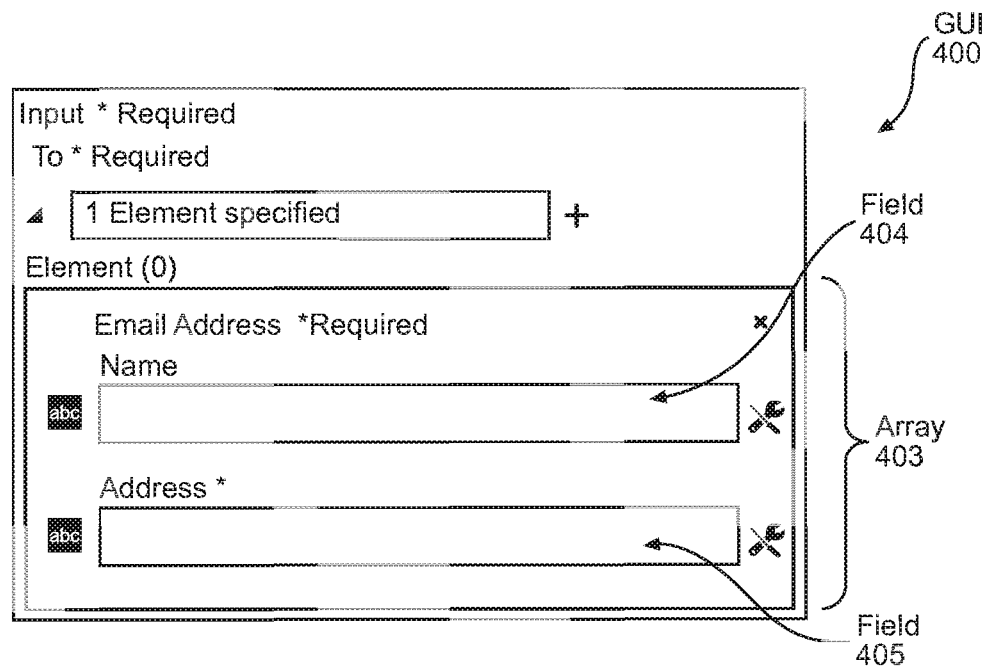
Figure 4C:
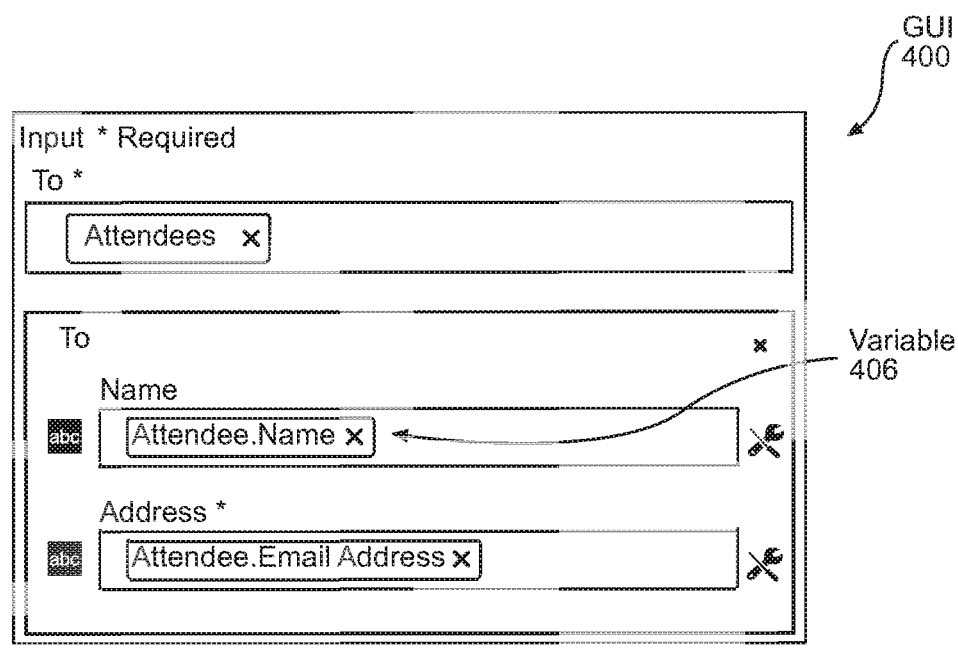

In an embodiment, the PIAR management application 108 supports plug-in applications that supply and/or accept multiple instances of a particular variable. When a PIAR is evaluated or executed, transformations selected for a particular variable may be applied to all instances of the variable. For example, the GUI 400 illustrates that the "Create Event" operation supplies and/or accepts multiple instances of the "Attendee" variable. Further, in this example, the "Attendee" variable is actually an array of variables, where each instance of the "Attendee" variable includes a "Name" variable and an "Email Address" variable. In FIG. 4A, the GUI 400 provides an array selector 402 that allows the user to 'drill down' into the array, to interact with the component variables of the array. FIG. 4B illustrates an example of an expanded array 403. One field 404 corresponds to the "Name" variable and another field 405 corresponds to the "Address" (i.e., email address) variable. As illustrated in FIG. 4C, the user may select an input variable 406 to be supplied as input to a particular field. The input variable 406 may originate from another plug-in application. If the user selects, via the GUI 400, a transformation operation to be applied to attendees' email addresses, the PIAR management application 108 may iteratively apply the transformation operation to all instances of the "Email Address" variable in all instances of the "Attendee" variable for the "Create Event" operation.

As noted above, operations and/or variables may be associated with plug-in applications. However, in an embodiment, the PIAR management application 108 also provides access to global operations and/or variables. These operations and/or variables are called "global" because they are available regardless of which plug-in applications are configured. For example, given a particular user logged into the PIAR management application 108, certain information about the user may be available for use in PIAR definitions, such as the user's name, organizational unit, company, security clearances, etc. Further, the PIAR management application 108 may support certain actions that are native to the PIAR management application 108 and do not require a plug-in application. For example, the PIAR management application 108 may support email, data logging, and/or other types of natively supported operations. Alternatively, the PIAR management application 108 may not support any native actions and may require a plug-in application for all actions included in PIAR definitions.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used according to an embodiment. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
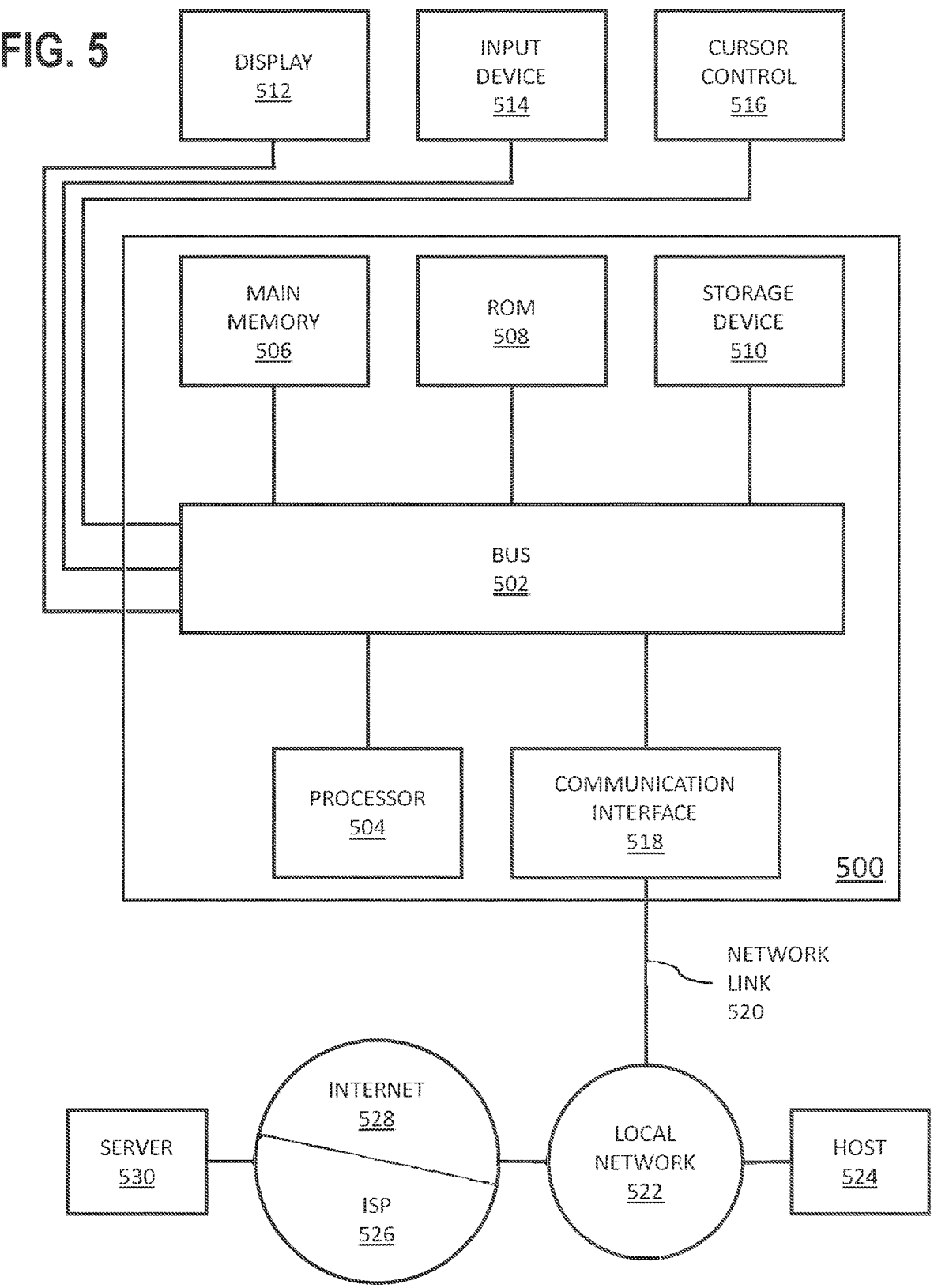
FIG. 5 is a block diagram illustrating a computer system according to an embodiment.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    obtaining a value for a variable for an operation of a plug-in-application recipe (PIAR) definition managed by a PIAR management application,
        wherein the PIAR management application manages PIAR definitions, each PIAR definition identifying
        (a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
        (b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition,
        wherein the PIAR management application makes the action conditional on the trigger on an ongoing basis, and
        wherein the PIAR definition comprises a particular trigger and a particular action, the operation comprising the particular trigger or the particular action;
    determining that a transformation operation is associated with the operation;
    applying the transformation operation to the value for the variable;
    inputting the transformed value for the variable into the operation for evaluation.

2. The media of claim 1, wherein determining that the transformation operation is associated with the operation comprises:
    obtaining a PIAR definition object including the PIAR definition from a digital storage;
    parsing the PIAR definition object;
    determining that the PIAR definition object includes scripting language corresponding to the transformation operation.

3. The media of claim 2, wherein the PIAR definition object is stored in a JavaScript Object Notation (JSON) structure, with elements in the JSON structure respectively corresponding to the particular trigger and the particular action.

4. The media of claim 1, wherein the value for the variable is output from the first plug-in application.

5. The media of claim 1, wherein the value for the variable is output from a second PIAR definition, of the PIAR definitions managed by the PIAR management application.

6. The media of claim 1, wherein the value for the variable is output from a second transformation operation also associated with the operation.

7. The media of claim 1, further storing instructions which cause:
   determining whether the transformation operation is permitted;
   wherein applying the transformation operation to the value for the variable is responsive at least to determining that the transformation operation is permitted.

8. The media of claim 1, wherein applying the transformation operation to the value for the variable comprises:
   converting the transformation operation into machine-executable code.

9. The media of claim 1, wherein the transformation operation is specified via a graphical user interface (GUI) of the PIAR management application, and the GUI is also configured to accept specification of the PIAR definition comprising the particular trigger and the particular action.

10. A system, comprising:
    one or more devices including one or more hardware processors; and
    the system being configured to perform operations comprising:
    obtaining a value for a variable for an operation of a plug-in-application recipe (PIAR) definition managed by a PIAR management application,
      wherein the PIAR management application manages PIAR definitions, each PIAR definition identifying
      (a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
      (b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition,
      wherein the PIAR management application makes the action conditional on the trigger on an ongoing basis, and
      wherein the PIAR definition comprises a particular trigger and a particular action, the operation comprising the particular trigger or the particular action;
    determining that a transformation operation is associated with the operation;
    applying the transformation operation to the value for the variable;
    inputting the transformed value for the variable into the operation for evaluation.

11. One or more non-transitory machine-readable media storing instructions which, when executed by one or more processors, cause:
    receiving, via a user interface of a plug-in-application recipe (PIAR) management application, a specification of a variable for an operation of a PIAR definition, wherein the PIAR management application manages PIAR definitions, each PIAR definition identifying
      (a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
      (b) an action, wherein an instance of evaluating the action comprises carrying out the action based on one or more values of one or more input variables that are input to the action in the PIAR definition,
      wherein the PIAR management application makes the action conditional on the trigger on an ongoing basis, and
      wherein the PIAR definition comprises a particular trigger and a particular action, the operation comprising the particular trigger or the particular action;
    receiving, via the user interface with respect to the variable associated with the operation, a specification of a first transformation operation for the variable prior to a particular instance of evaluating the operation using the variable;
    generating a PIAR definition object defining the particular trigger, the particular action, and the first transformation operation; and
    storing, by the PIAR management application, the PIAR definition object for evaluation on an ongoing basis.

12. The media of claim 11, wherein the first transformation operation is specified via the user interface as free-form text.

13. The media of claim 11, wherein the first transformation operation is specified via the user interface as a custom script.

14. The media of claim 11, wherein the first transformation operation is manually entered via the user interface, without referring to any predefined transformation operations associated with the PIAR management application.

15. The media of claim 11, further storing instructions which cause:
    determining whether the transformation operation is permitted; and
    storing, by the PIAR management application, the PIAR definition object for evaluation on the ongoing basis is responsive at least to determining that the transformation operation is permitted.

16. The media of claim 11, wherein a second plug-in application exposes an interface to the PIAR management application for causing the second plug-in application to carry out the action.

17. The media of claim 11, wherein the PIAR management application is configured to carry out the action.

18. The media of claim 11, further storing instructions which cause:
    receiving, during evaluation of the operation, a value of the variable associated with the operation;
    transforming the value of the variable by applying the first transformation operation to obtain a transformed variable value; and
    continuing evaluation of the operation using the transformed variable value.

19. The media of claim 11, wherein generating the PIAR definition object comprises:
retrieving, from a plurality of stored scripts for transforming inputs to outputs, a particular script corresponding to the first transformation operation,
wherein the PIAR definition object comprises:
(a) a representation of the operation as evaluable code, intact as if there were no first transformation operation, and
(b) the first transformation operation represented as the particular script being mapped to the operation, in-line with the representation of the operation.

20. The media of claim 11, further storing instructions which cause:
after receiving the specification of the first transformation operation,
receiving, via the GUI, a specification of a second transformation operation,
wherein the second transformation operation is to be performed on an output of applying the first transformation operation to a value of the variable.

21. A method, comprising:
obtaining a value for a variable for an operation of a plug-in-application recipe (PIAR) definition managed by a PIAR management application,
wherein the PIAR management application manages PIAR definitions, each PIAR definition identifying
(a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
(b) an action for which a second plug-in application exposes an interface to the PIAR management application for causing the second plug-in application to carry out the action, wherein an instance of evaluating the action comprises carrying out the action based on one or more values of one or more input variables that are input to the action in the PIAR definition,
wherein the PIAR management application makes the action conditional on the trigger on an ongoing basis, and
wherein the PIAR definition comprises a particular trigger and a particular action, the operation comprising the particular trigger or the particular action;
determining that a transformation operation is associated with the operation;
applying the transformation operation to the value for the variable;
inputting the transformed value for the variable into the operation for evaluation;
wherein the method is performed by one or more devices, each including one or more hardware processors.

22. A system, comprising:
one or more devices, each including one or more hardware processors;
the system being configured to perform operations comprising:
receiving, via a user interface of a plug-in-application recipe (PIAR) management application, a specification of a variable for an operation of a PIAR definition,
wherein the PIAR management application manages PIAR definitions, each PIAR definition identifying
(a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
(b) an action, wherein an instance of evaluating the action comprises carrying out the action based on one or more values of one or more input variables that are input to the action in the PIAR definition,
wherein the PIAR management application makes the action conditional on the trigger on an ongoing basis, and
wherein the PIAR definition comprises a particular trigger and a particular action, the operation comprising the particular trigger or the particular action;
receiving, via the user interface with respect to the variable associated with the operation, a specification of a first transformation operation for the variable prior to a particular instance of evaluating the operation using the variable;
generating a PIAR definition object defining the particular trigger, the particular action, and the first transformation operation; and
storing, by the PIAR management application, the PIAR definition object for evaluation on an ongoing basis.

23. A method, comprising:
receiving, via a user interface of a plug-in-application recipe (PIAR) management application, a specification of a variable for an operation of a PIAR definition,
wherein the PIAR management application manages PIAR definitions, each PIAR definition identifying
(a) a trigger for which one or more trigger variables, values of which are necessary to evaluate the trigger on an ongoing basis, are exposed by a first plug-in application to the PIAR management application, wherein an instance of evaluating the trigger comprises determining whether a condition is satisfied based at least in part on one or more values of the one or more trigger variables, and
(b) an action, wherein an instance of evaluating the action comprises carrying out the action based on one or more values of one or more input variables that are input to the action in the PIAR definition,
wherein the PIAR management application makes the action conditional on the trigger on an ongoing basis, and
wherein the PIAR definition comprises a particular trigger and a particular action, the operation comprising the particular trigger or the particular action;
receiving, via the user interface with respect to the variable associated with the operation, a specification of a first transformation operation for the variable prior to a particular instance of evaluating the operation using the variable;
generating a PIAR definition object defining the particular trigger, the particular action, and the first transformation operation; and
storing, by the PIAR management application, the PIAR definition object for evaluation on an ongoing basis;
wherein the method is performed by one or more devices, each including one or more hardware processors.

\* \* \* \* \*